T. C. YEOMANS,

*Impt. in Grape and Vine-Trellis.*

4469

REISSUED JUL 11 1871

*Witnesses*

Geo. W. Purton.

F. A. Morley

*Inventor.*

Theron G. Yeomans

UNITED STATES PATENT OFFICE.

THERON G. YEOMANS, OF WALWORTH, NEW YORK.

IMPROVEMENT IN GRAPE AND VINE-TRELLISES.

Specification forming part of Letters Patent No. 84,154, dated November 17, 1868; reissue No. 4,469, dated July 11, 1871.

*To all whom it may concern:*

Be it known that I, THERON G. YEOMANS, of Walworth, in the county of Wayne and State of New York, have invented a new and useful Improvement in Grape-Vine Trellises; and do hereby declare that the following is a full, clear, and exact description thereof, which will enable those skilled in the art to make and use the same, reference being had to the accompanying drawing forming part of this specification, in which—

Figure 1:
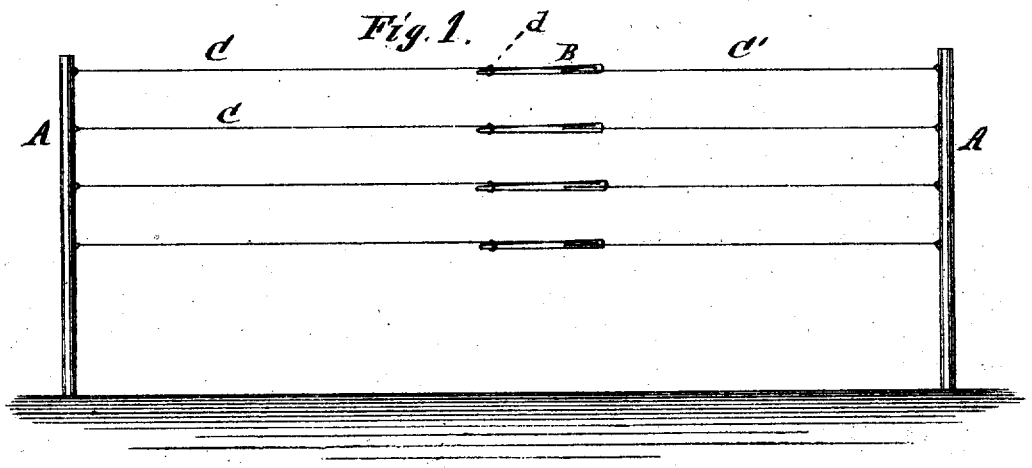
Figure 1:
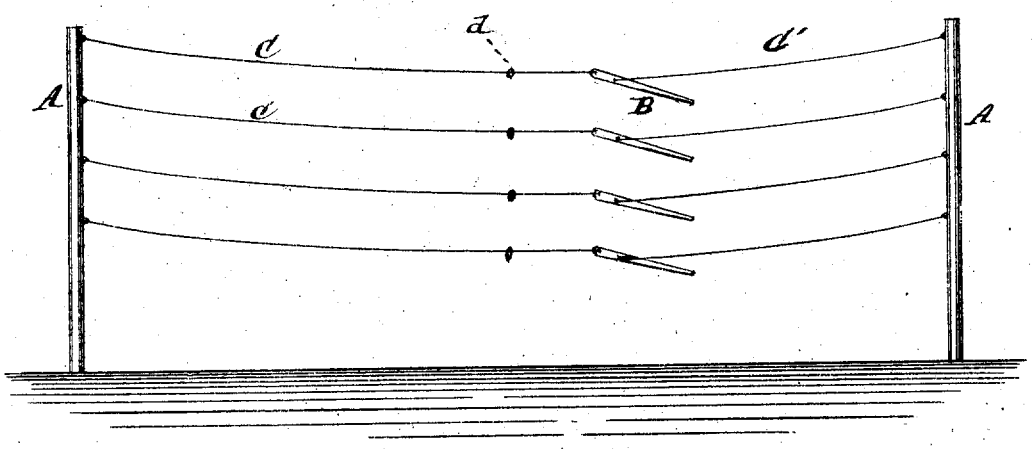

Figure 1 is a side view of my invention, showing the position of the parts when the wires are tightened; and Fig. 2 is a like view, showing the wires when slackened.

Similar letters of reference indicate like parts.

In using wire for the bars of trellises it is necessary to slacken them when not in use during the winter season; or, owing to the contraction of the wires by cold, undue strain is brought upon them and they are liable to be broken, and the supporting-posts are also pulled out of position by the additional strain and by the softening of the ground at the latter part of winter. This invention consists in attaching to each of the wire bars a short hand-lever, so that the bars are tightened or slackened with the greatest facility and in a very simple and inexpensive manner, as hereinafter more fully explained.

In the accompanying drawing, A A are the supports or posts, and C C are the wire bars. B B are the tightening-levers. In applying the levers I cut each bar near one end and connect the two parts of the bar or wire by the lever B, the part C being fastened to the working end of the lever, while the part C′ is fastened nearer the center of the lever, and acts as its fulcrum. To tighten the bars the handle of the lever is carried up in line with the bar, as seen in Fig. 1, and secured by a ring, *d*, which slides on the bar. The released position of the tightening-levers is shown by Fig. 2.

The levers B are eighteeen inches in length, more or less, with the fulcrum a few inches from the working end, and are made of iron, wood, or of other suitable material. With a fulcrum at about four inches from the end of the lever its tightening throw or reach is about eight inches. This straining or tightening device is inexpensive, the levers being easily applied by twisting the ends of the wires into holes in said levers; and the locking-rings *d* are made very light, so that their cost is very little.

The device is designed more especially for grape-vine trellises, but is equally suited for hop-trellises, and for trellis purposes generally.

The levers B can be made of iron, wood, or other suitable material, and may be made to work on the posts A or be placed at any point along the wires or bar, as desired. However, I prefer to place them on the bar, but so near one end of the same, or near the posts, as to be easily reached by a person walking along the end of the trellis-rows, so that a large number of trellises may be adjusted in a very short time.

Having thus described my invention, what I claim, and desire to secure by Letters Patent, is—

The lever B, used in connection with the wire or trellis-bars C, the posts A, and the ring *d*, constructed and operated substantially as and for the purposes above specified.

THERON G. YEOMANS.

Witnesses:

L. T. YEOMANS,

G. W. DURSON.